United States Patent [19]

Samhaber

[11] Patent Number: 4,462,911
[45] Date of Patent: Jul. 31, 1984

[54] DETOXIFICATION OR DECONTAMINATION OF EFFLUENTS AND/OR FLUE GASES

[75] Inventor: Friedrich Samhaber, Peuerbach, Austria

[73] Assignee: Andritz-Ruthner Industrieanlagen Aktiengesellschaft, Vienna, Austria

[21] Appl. No.: 369,082

[22] Filed: Apr. 16, 1982

[30] Foreign Application Priority Data

Apr. 16, 1981 [AT] Austria .............................. 1756/81

[51] Int. Cl.$^3$ .............................................. C02F 1/62
[52] U.S. Cl. .................................. 210/638; 210/720; 210/913; 210/919; 423/235
[58] Field of Search ............... 210/720, 913, 919, 635, 210/638, 639, 748, 721; 423/235

[56] References Cited

U.S. PATENT DOCUMENTS 3,725,266  4/1973  Haviland ........................ 210/913 X
3,810,542  5/1974  Gloster et al. ...................... 210/720
3,901,805  8/1975  Stewart.

FOREIGN PATENT DOCUMENTS 4927057  3/1972  Japan ................................. 210/913
56-63000  5/1981  Japan ................................. 210/913

*Primary Examiner*—Thomas G. Wyse
*Attorney, Agent, or Firm*—Fleit, Jacobson, Cohn & Price

[57] ABSTRACT

This invention provides a process for detoxifying or decontaminating liquid effluents and/or waste gas containing poisonous chromium (VI) NOx by reacting these with each other with formation of chromium (III) and higher oxide(s) of N. Optionally in addition another suitable reducing agent may be used.

The process is particularly useful, for example, in a plant such as a stainless steel pickling plant where both these chemical components are available. Preferably liquid-liquid extraction may be used to extract and recover nitric acid formed as an oxidation product and preferably if additional chromium (VI) is required, this may be provided by electrolytic oxidation of chromium (III) to chromium (VI) in a suitable chemical circuit.

7 Claims, 1 Drawing Figure

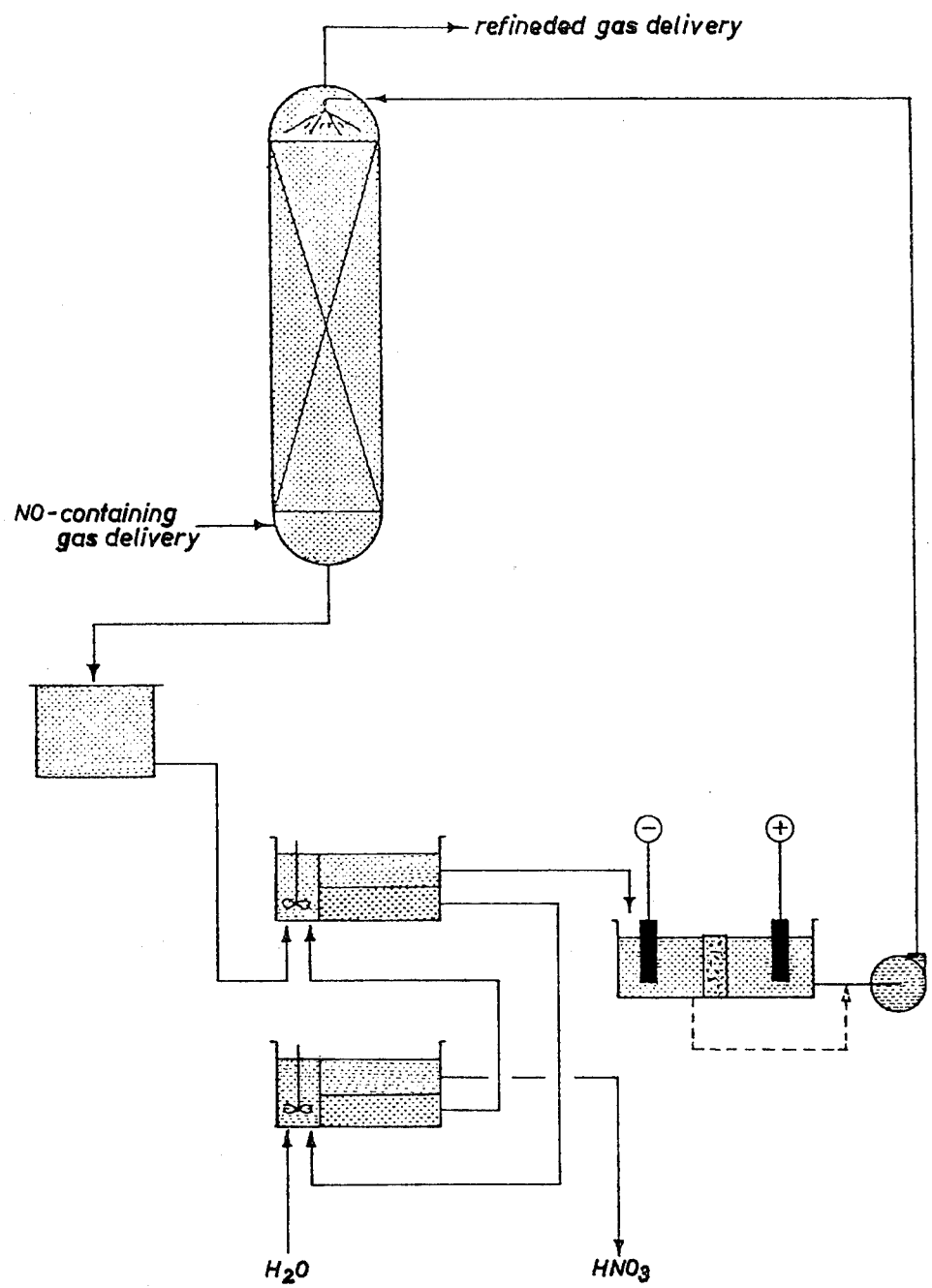

DETOXIFICATION OR DECONTAMINATION OF EFFLUENTS AND/OR FLUE GASES

BACKGROUND OF THE INVENTION

The present invention relates to a process for detoxifying waste or decontaminating liquid effluents and/or waste gases. More particularly, the present invention relates to such a process for example wherein the liquid effluent or waste water contains chromium (VI) compounds and/or the waste or flue gases, effluents or acid rinsing waters contain NO and/or $NO_2$. The NO and/or $NO_2$ component will in the following be referred to as $NO_x$ wherein x may represent numerical values between 0,5 and 2 and $NO_2$ is identical with $N_2O_4$.

The process of the invention may be applied in the purification and/or detoxification of effluents or flue gases containing NO and/or $NO_2$ and chromium (VI)-containing waste waters or solutions.

In many electrochemical processes in which electrolytes containing chromium salts are used, effluents are produced which contain chromium (VI), the removal of which for environmental reasons is required because of the high toxicity of chromium (VI) compounds. Such removal is, however, problematic and costly. These poisonous effluents may contain hexavalent chromium in the form of $CrO_4^{2-}$ anions or $Cr_2O_7^{2-}$ anions depending on the pH value. Because chromium (VI) compounds are many times as poisonous as chromium (III) compounds, or because chromium (III) compounds compared with chromium (VI) compounds are virtually not toxic, most detoxification methods for chromium (VI)-containing effluents carried out at present on a technical scale rely on a reduction of the chromium (VI) to chromium (III) compounds.

At present, detoxification of such effluents containing chromium (VI) is carried out with the aid of commercially available chemicals of specified composition having a strong reducing action. Iron (II) sulphate or alkali sulphites in particular are commonly used as such commercially available chemicals. These chemicals suffer the disadvantage that they are expensive, that they are usually not available in the same plant and accordingly are subject to additional freight and transportation costs and involve substantial manipulation costs. In addition, the reaction products of those chemicals contaminate the effluent.

It is an object of the present invention to avoid either fully or at least partly the use of such commercially available chemicals.

It is also an object of the present invention to utilise in the same industrial plant where possible, two groups of polluting substances to render both groups effectively harmless.

SUMMARY OF THE INVENTION

According to one aspect of the present invention, there is provided a process for detoxifying or decontaminating effluents and/or waste gas containing chromium (VI) and/or $NO_x$, by causing chromium (VI) to react with $NO_x$, and optionally in addition with another suitable reducing agent, with formation of chromium (III) and higher oxide(s) of N. Solutions containing $Cr_2O_7^{2-}$ and/or $CrO_4^{2-}$ may preferably be used as chromium-containing solutions.

The $NO_x$-containing waste gases may be contacted with water or acidic washing water prior to reaction with chromium (VI) effluent.

Nitric acid, formed as an oxidation product of $NO_x$, may be removed from the reaction solution by extraction and recovered.

For complete oxidation of $NO_x$, chromium (IV) may be provided by electrolytic oxidation of chromium (III) produced as a reaction product in the conversion of $NO_x$ to higher oxide(s) of N.

The reaction solution may be pumped along a circuit including being passed through a liquid-liquid extraction apparatus for extracting nitric acid and a through-flow electrolytic cell for oxidising chromium (III) to chromium (VI) and thereafter is recycled into a reaction chamber. Preferably the reaction chamber may be provided in a waste gas washing installation.

Also according to the invention, there is provided a process for detoxifying or decontaminating effluent containing chromium (VI) waste gas containing $NO_x$ for example in a stainless steel pickling plant, wherein the waste gas is contacted with water or acidic washing water to dissolve $NO_x$ therein in a countercurrent waste gas washing installation and the chromium (VI) solution is reacted with the $NO_x$ in solution in the washing installation, whereafter the reaction solution is passed through a liquid-liquid extraction apparatus to extract nitric acid for recovery and thereafter the solution is passed to a through-flow electrolytic cell to oxidise chromium (III) to chromium (VI) which is recycled to the waste gas washing installation for subsequent reaction with $NO_x$ in solution.

According to the process forming the subject of the present invention, there not only takes place a reduction or removal of the toxic content of the chromium (VI)-containing effluents, but also of the $NO_x$-containing flue gases or waste waters. If in a production plant or factory, chromium (VI)-containing waste waters as well as $NO_x$-containing flue gases or waste waters arise, the process according to the invention permits saving on disposal or detoxification costs in a dual manner since the toxic or noxious contents of the one waste gas are reduced or eliminated by those of another waste gas or waste water and vice versa.

According to hitherto conventional procedures on the other hand, both the toxic content of the chromium (VI)-containing waste water as well as independently thereof the $NO_x$ content of the $NO_x$-containing flue gases or waste waters is reduced or eliminated by the addition of externally purchased commercially available chemicals. This double expenditure on chemicals can be saved according to the process of the present invention depending on the amounts and noxious contents of the waste gases and waste waters becoming available, either substantially or totally. In addition, in doing so, the $NO_x$ content is converted into a recoverable form and may for example be recovered as $HNO_3$ by extraction.

DETAILED DESCRIPTION OF THE INVENTION

A typical example for a combined plant in which both chromium (VI)-containing effluents as well as $NO_x$-containing flue gases arise, is represented by a stainless steel pickling line in which stainless steel is pickled first electrolytically in a neutral electrolyte and subsequently in a hydrofluoric acid/nitric acid mixture.

In the electrolytic pickling process in a neutral electrolyte, part of the chromium derived from the stainless steel is oxidised into a chromium (VI) compound and this enters into the effluent.

In the subsequent final treatment of the stainless steel in the hydrofluoric acid/nitric acid mixture, $NO_x$-containing flue gas is formed which is drawn off and must be disposed of or treated.

This combination of plant(s) represent(s) an ideal case for the application of the process according to this invention. In such a case the detoxification or decontamination of the waste water and waste gas is advantageously carried out for example, in such a manner that the $NO_x$-containing flue gases are washed in one or more washing towers with the acid waste waters containing chromium (VI). In doing so, the $NO_x$ content of the flue gas is oxidised to $NO_3$ and the chromium (VI) compounds are reduced into chromium (III) compounds, thereby being detoxified according to the following equations:

$$2NO + Cr_2O_7^{2-} + 6H^+ \rightarrow 2NO_3^- + 2Cr^{3+} + 3H_2O$$

$$6NO_2 + Cr_2O_7^{2-} + 2H^+ \rightarrow 6NO_3^- + 2Cr^{3+} + H_2O$$

The redox potentials are as follows:

$$NO_g + 2H_2O/NO_3^- + 4H^+ : +0{,}96V$$

$$N_2O_{4g} + 2H_2O/2NO_3^- + 4H^+ : +0{,}81V$$

It is also possible to wash the $NO_x$-containing flue gases with water or dilute acids and to react the wash water with the waste waters containing chromium (VI).

The chromium (VI)-containing effluents derived from the electrolytic pickling process usually have a pH value of about 0.5. This pH value is very suitable for the desired conversion. The chromium (VI)-containing effluents of which the hydrogen ion concentration is too low, are adjusted preferably by acidification to this or to a similar pH value.

If the available amount of flue gases containing $NO_x$ is inadequate for the complete reduction of the chromium (VI) compounds in the effluent, the remainder must be converted into chromium (III) in a conventional manner by the addition of a reducing agent.

In the plant combination electrolytic pickling and hydrofluoric acid/nitric acid (mixed acid) pickling the contrary is usually the case, however, and the available amount of $NO_x$-containing flue gases usually exceeds the amount of chromium (VI) in the effluent. The quantitative reduction of chromium (VI) is possible therefore. However, there remains in this case an excess of $NO_x$ components.

In order to provide a technical solution for the chromium (VI) effluent problem as well as the $NO_x$ flue gas problem even in cases as set out above, it is recommended as a modification of the process to generate the shortfall of chromium (VI) compounds required for the substantial or complete conversion of the $NO_x$-contents of the waste gases in the chromium (VI)-containing waste waters by electrolytic oxidation of the chromium (III) compounds there present.

This may be carried out either such that the electrolysis is carried out directly with the chromium-containing waste water prior to its being used for washing the $NO_x$ flue gases or for reaction with the washing liquor of the $NO_x$ flue gases.

Alternatively, a circuit with an acid chromium (VI) salt solution may be installed independently of and following in series onto the chromium (VI) effluent detoxification stage and is used first for the washing of the $NO_x$ flue gases—a portion of the chromium (VI) compounds being converted into chromium (III) compounds—subsequently being passed through an electrolytic oxidation cell in which chromium (III) compounds are once again regenerated into chromium (VI) compounds and thus being available again for washing the $NO_x$ flue gases.

The nitric acid which in that case builds up in the liquid circuit may be removed therefrom for example by liquid/liquid extraction according to a conventional process continuously or intermittently. For this purpose a mixture of tributylphosphate and an organic diluent which is insoluble in water, e.g. hexachlorobutadiene can be used with particular advantage as an organic extracting agent.

The above described process stage may also be carried out independently of the chromium (VI) effluent detoxification stage. This is to be recommended in cases where $NO_x$ flue gases are to be decontaminated without chromium (VI)-containing waste waters being available in the same plant.

DESCRIPTION OF THE PREFERRED EMBODIMENTS

EXAMPLE 1

An absorption column charged with filling bodies, four meters high and of 400 mm diameter of acid resistant material is irrigated with waste water derived from an electrolytic stainless steel pickling plant and having the following composition:

Cr(VI): 3,9 g/l
Cr(III): 0,5 g/l
$Na_2SO_4$: 28,5 g/l
$HNO_3$: 5,0 g/l
$H_2SO_4$: 18,0 g/l
Fe(III): 7,5 g/l

This waste water which at the start of the washing process has a pH value of 0,4 is sprayed into the column at the top thereof and collects at the bottom of the column from where it is passed to a collecting tank. From there it is withdrawn by a pump and recycled to the head of the column. The amount of effluent circulated by pumping amounts to 2 $m^3$ per hour. NO-containing waste gas from a mixed acid stainless steel pickling plant (NO content 12,000 ppm by mass) is introduced at the bottom of the column through a side nipple at such a rate that the residence period in the absorption tower amounts to 6 seconds.

After an operating period of 5½ hours, the total chromium (VI) content had been reduced and thus detoxified. The $HNO_3$ content of the circulating liquid was increased thereby to 10 g/l.

EXAMPLE 2

The process is carried out as described in Example 1, however, using instead of a single absorption unit (composed of the absorption column, collecting tank and pump) four such absorption units in series with one another. In this case the NO-containing waste gas is introduced at the bottom of column I and passed from the head of column I to the bottom of column II, from the head of the column II to the bottom of the column III and finally from the head of the column III to the bottom of the column IV. Decontaminated flue gas then leaves the head of column IV. In each of the four absorption units waste water flows having different concentrations in respect of their chromium (VI) content are circulated independently from one another. At the start of the operation, the composition of the waste water in the collecting vessel IV corresponds to that of example 1. The chromium (VI) content in the collecting vessel V is less than that in vessel IV, in vessel II it is less than in vessel III and in vessel I it is less than in vessel II. After an operating period of 2 hours the contents of collecting vessel I which in the meantime have been rendered chromium (VI)-free are pumped off into an aerating vessel in which the residual NO content is aerated out by the introduction of inert gas. The contents of vessel II are subsequently pumped off into vessel I, those of vessel III into vessel II and those of vessel IV into vessel III. Hence the vessel IV is filled with fresh chromium VI-containing waste water-whereby the original operating condition is re-established.

This pulse-wise pumping over operation carried out every 2 hours results in a semi-continuous operation in which the flue gas to be decomtaminated and the waste water are conducted in countercurrent to one another. The chromium (VI) content of the waste water is thus converted quantitatively into chromium (III) compounds, thereby being detoxified.

EXAMPLE 3

The process is carried out as in example 1, however, instead of the NO-containing flue gases, a flue gas having an NO content of 1500 ppm and an $NO_2$ content of 1600 ppm is used and instead of the waste water derived from the electrolytic stainless steel pickling plant, a sulphuric acid dichromate solution having a chromium (VI) content of 20,65 g/l is used for washing the $NO_x$-containing flue gas. The pH value of this solution amounts to 0,5. The $NO_x$ content of the flue gases is removed from the flue gas except for a residue of 300 ppm.

EXAMPLE 4

(See FIG. 1)

A throughflow electrolyte cell of conventional construction comprising two graphite electrodes and a diaphragm of ceramic material (e.g. produced by calcining a mixture of 75% $Al_2O_3$ and 25% $SiO_2$) is fed with an aqueous solution containing 100 g/l $Cr_2O_3$ (in the form of the sulphate) and 450 g/l $H_2SO_4$. The electrolysis proceeds at a current density of 3 A/dm$^2$, a voltage of 3,5 volt and a temperature of 50° C., chromic acid being formed at the anode. At the cathode hydrogen is evolved. The electric efficiency amounts to about 80% and the electricity consumption about 3,5 kWh per kg $CrO_3$.

The cathode space of the throughflow cell is fed continuously with the solution depleted in Cr (VI) and enriched in Cr (III), discharged from the $NO_x$ washing tower (which is fed with a flue gas of the composition as per example 3. Aqueous solution enriched in Cr (VI) and depleted in Cr (III) is discharged from the anode space at the same rate and after passing a 3-stage mixer-separator device in which excess nitric acid is removed, and is recycled via an intermediate vessel and a pump to the head of the $NO_x$ absorption tower where the liquid circuit is completed. A bypass conduit which leads directly from the cathode space to the pump permits bypassing of the diaphragm and the anode space by a controllable liquid flow.

In the mixer-separator device nitric acid is extracted from the aqueous phase with an extracting agent containing 65% by weight tributyl phosphide and 35% by weight hexachlorobutadiene, (phase ratio of organic-:aqueous phase equal to 3:1). The loaded extracting agent is regenerated with water in a 3-stage mixer separator device of similar construction and is recycled in its regenerated form to the first mixer-separator device. The regenerator contains the recovered nitric acid which is formed by the oxidation of NO and $NO_2$. The flue gas leaving the washing tower has an $NO_x$ content, (sum total of NO plus $NO_2$) of 100 ppm by volume.

It will be readily appreciated by any person skilled in the art that other modifications and variations of the invention are possible in addition to the embodiments described above. Such other modifications and variations are to be considered as falling within the spirit and scope of the invention as claimed herein.

The claims hereunder are to be considered part of the disclosure of this invention.

What is claimed is:

1. A process for detoxifying or decontaminating an effluent containing chromium (VI), and waste gas containing $NO_x$, wherein said effluent and said waste gas are reacted together, thereby causing chromium (VI) to react with $NO_x$, with formation of chromium (III) and higher oxide(s) of N.

2. A process as claimed in claim 1, wherein $NO_x$-containing waste gas is contacted with water or acidic washing water prior to reaction with chromium (VI) effluent.

3. A process as claimed in claim 1, wherein nitric acid, formed as an oxidation product of $NO_x$, is removed from the reaction solution by extraction and recovered.

4. A process as claimed in claim 1, wherein for complete oxidation of $NO_x$, chromium (VI) is provided by electrolytic oxidation of chromium (III) produced as a reaction product in the conversion of $NO_x$ to higher oxide(s) of N.

5. A process as claimed in claim 1, wherein the reaction solution is pumped along a circuit including being passed through a liquid-liquid extraction apparatus and a throughflow electrolytic cell and thereafter is recycled into a reaction chamber.

6. A process as claimed in claim 5, wherein the reaction chamber is provided in a waste gas washing installation.

7. A process for detoxifying or decontaminating effluent containing chromium (VI), and waste gas containing $NO_x$, for example in a stainless steel pickling plant, wherein the waste gas is contacted with water or acidic washing water to dissolve $NO_x$ therein in a counter current waste gas washing installation and the chromium (VI) solution is reacted with the $NO_x$ in solution in the washing installation, whereafter the reaction solution is passed through a liquid-liquid extraction apparatus to extract nitric acid for recovery and thereafter the solution is passed to a through-flow electrolytic cell to oxidise chromium (III) to chromium (VI) which is recycled to the waste gas washing installation for subsequent reaction with $NO_x$ in solution.

* * * * *